May 11, 1954 — R. I. HAHN ET AL — 2,678,097
TUBE CUTTING APPARATUS
Filed Nov. 19, 1948 — 4 Sheets-Sheet 1

INVENTORS
Rea I. Hahn &
Bernard E. Frank
and Donald P. Worden
BY
Spencer Hardman & Fehr
their attorneys

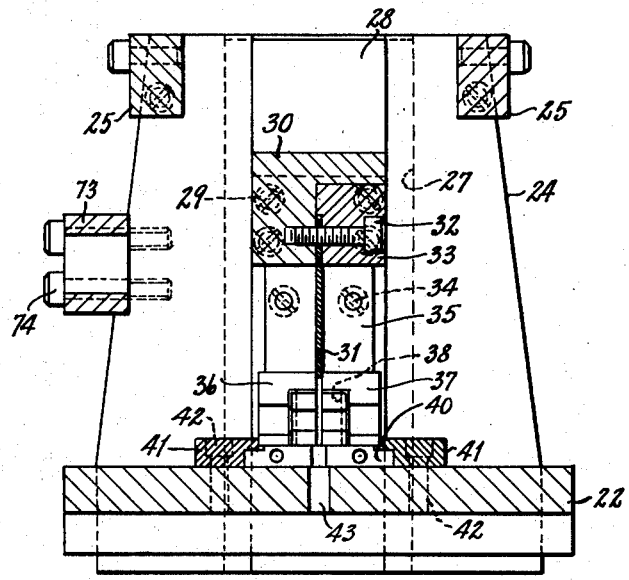
Fig. 8.
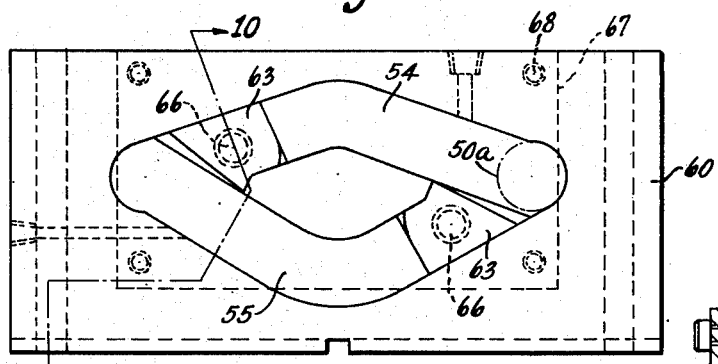
Fig. 9.
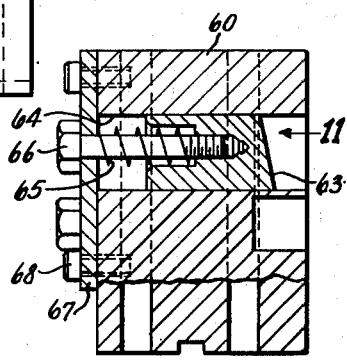
Fig. 10.
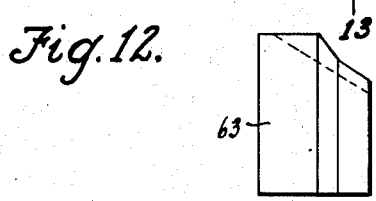
Fig. 11.
Fig. 12.
Fig. 13.

Patented May 11, 1954

2,678,097

UNITED STATES PATENT OFFICE 2,678,097

TUBE CUTTING APPARATUS

Rea I. Hahn, Bernard E. Frank, and Donald P. Worden, Rochester, N. Y., assignors to General Motors Corporation, Detroit, Mich., a corporation of Delaware Application November 19, 1948, Serial No. 61,022

8 Claims. (Cl. 164—48)

1

This invention relates to apparatus for cutting tubing into lengths while it is moved longitudinally from a supply reel.

An object of the invention is to cut the tubing into substantially equal lengths without stopping longitudinal movement thereof. This object is accomplished by the use of a carriage which is caused to move with the tubing and which provides a clamp for gripping the tubing and a shearing blade which cuts the tubing while it is gripped. The clamp and the blade are caused to operate in response to movement of the carriage. The carriage is moved by a fluid pressure servo which is caused to operate in response to the engagement of the end of the tubing with a member which is located so as to determine the length of the tubing cut off. The invention provides for minimizing the time interval between engagement of the member by the tubing and the instant when the carriage begins its movement.

Further objects and advantages of the present invention will be apparent from the following description, reference being had to the accompanying drawings, wherein a preferred embodiment of the present invention is clearly shown.

In the drawings:

Fig. 8 is a sectional view on line 8—8 of Fig. 4.

Fig. 9 is a view of a cam assembly in the direction of arrow 9 of Fig. 1.

Fig. 10 is a sectional view on line 10—10 of Fig. 9.

Fig. 11 is a view of one of the cam gate members as seen in the direction of arrow 11 of Fig. 10.

Figs. 12 and 13 are views in the direction of arrows 12 and 13 respectively of Fig. 11.

Figure 14:
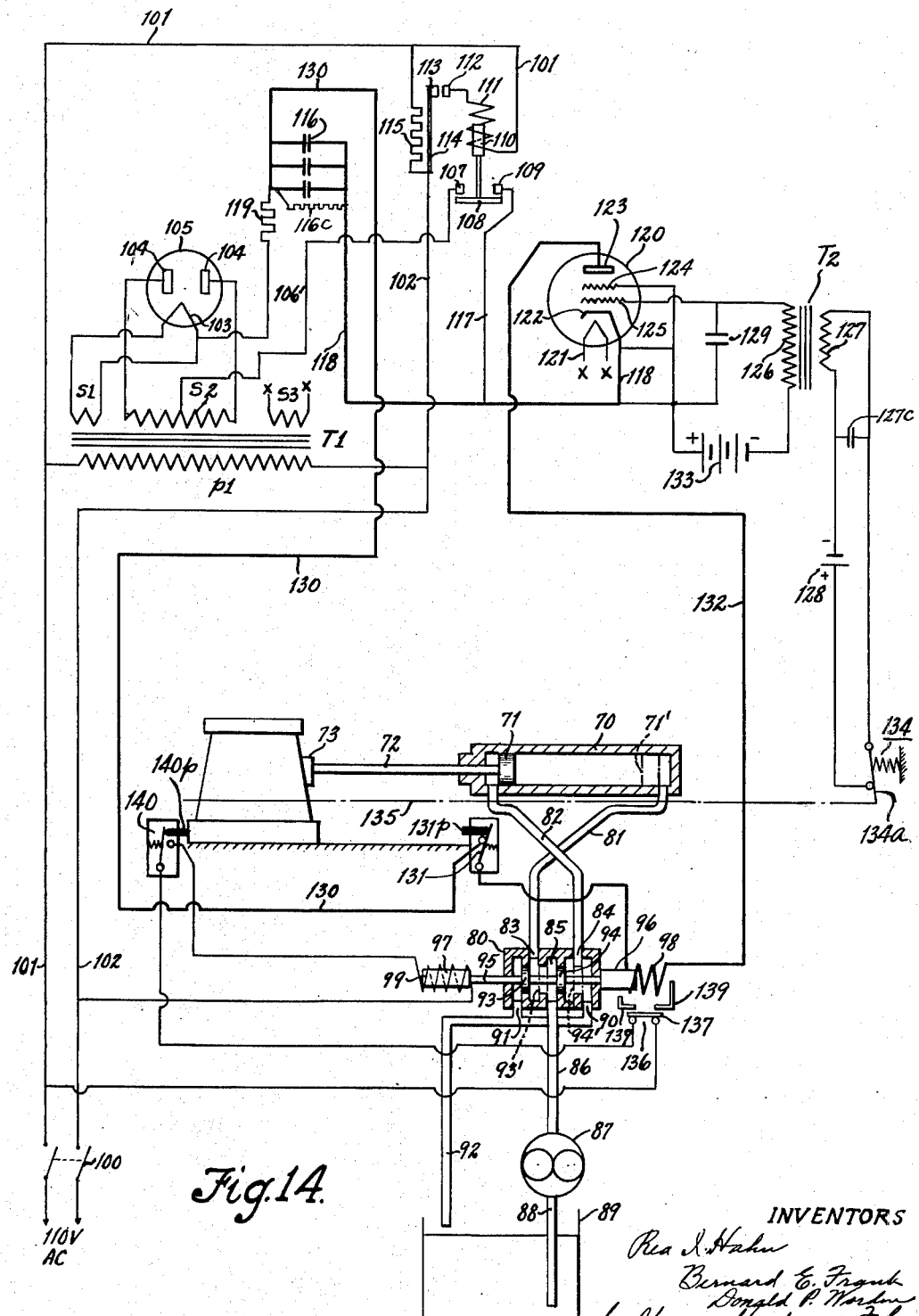

Fig. 14 is a wiring and hydraulic diagram.

Figure 1:
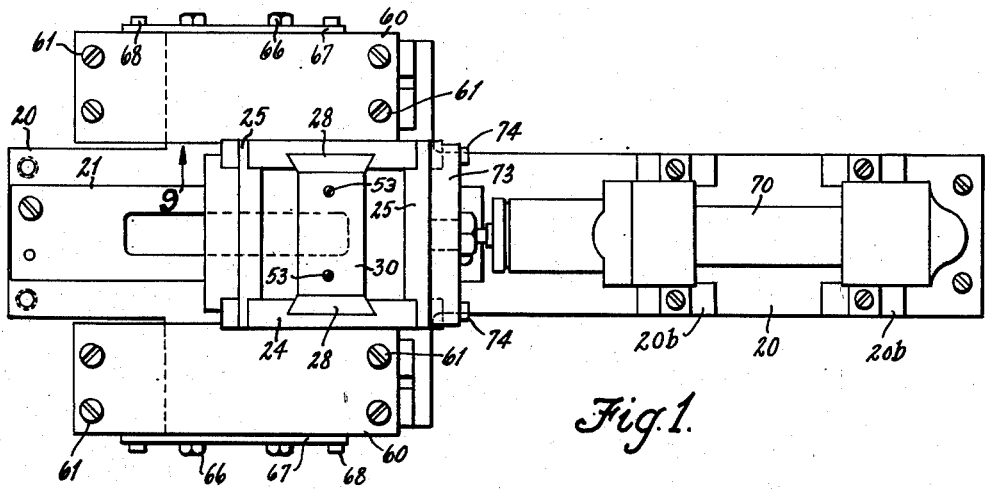
Fig. 1 is a plan view of the apparatus.
Figure 2:
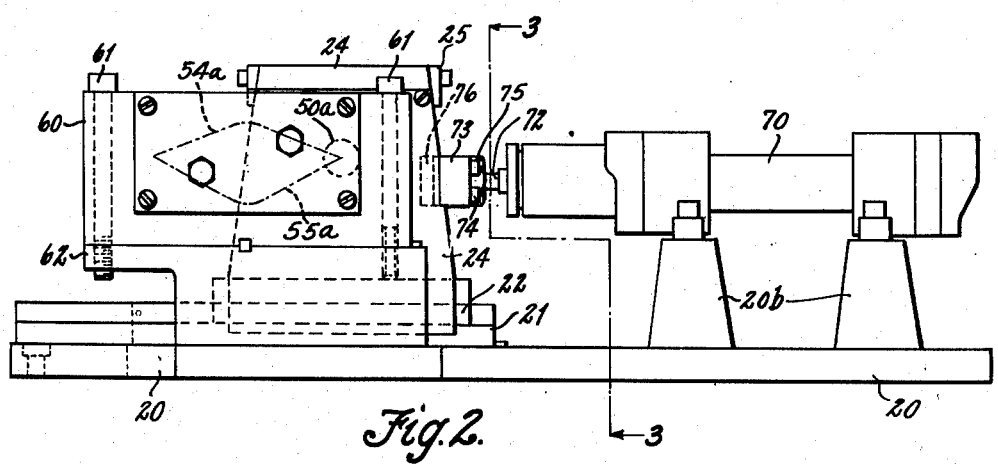
Fig. 2 is a side view.
Figure 3:
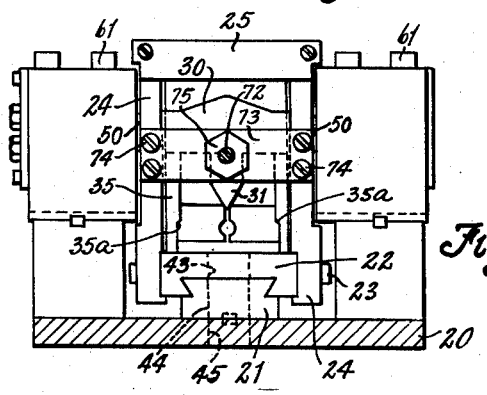
Fig. 3 is a sectional view on line 3—3 of Fig. 2.
Figures 4, 6:
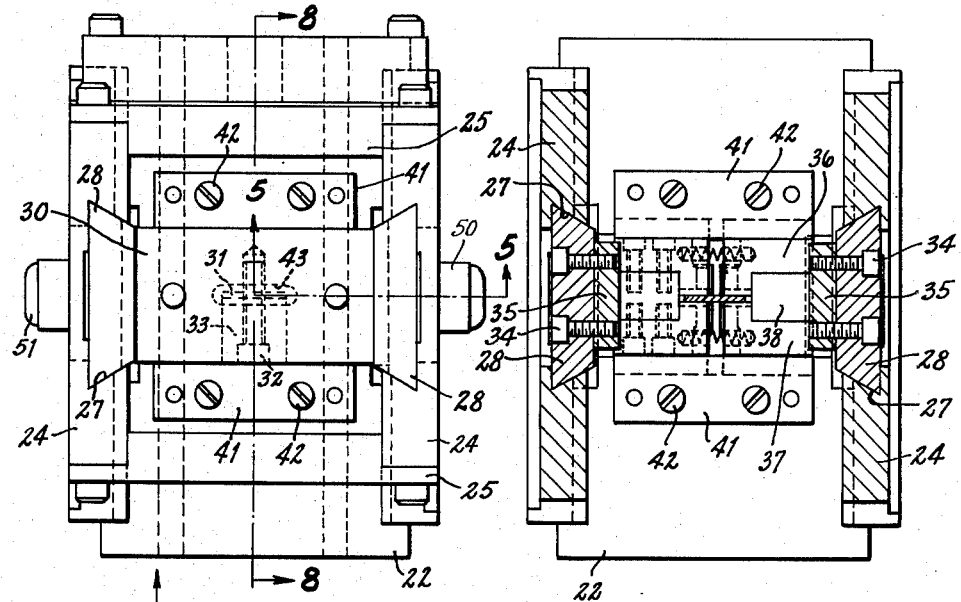
Fig. 4 is a plan view of the carriage assembly.
Fig. 6 is a sectional view on line 6—6 of Fig. 5.
Figures 5, 7:
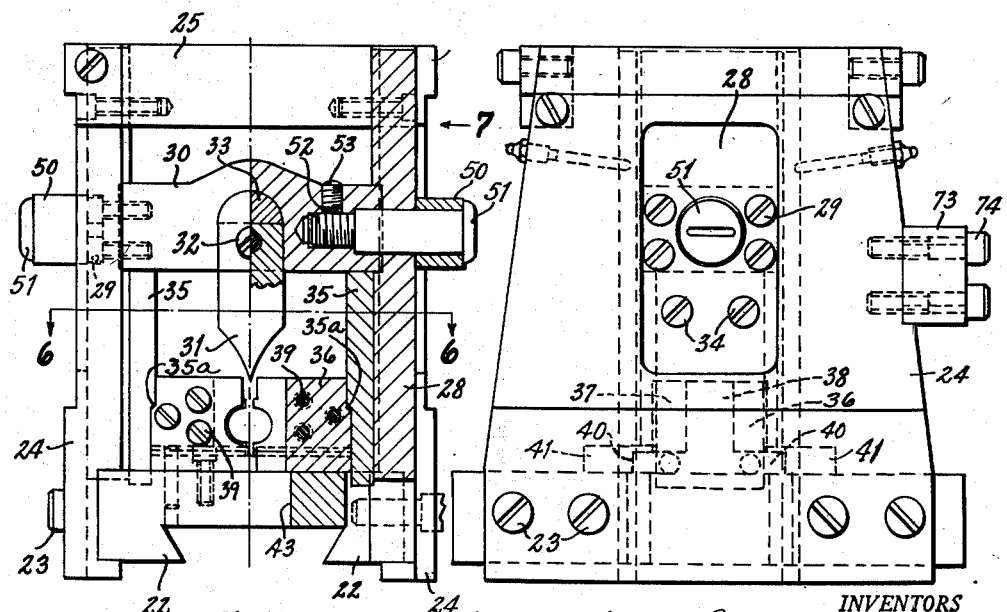
Fig. 5 is in part a view in the direction of arrow 5 of Fig. 4 and is a sectional view on line 5—5 of Fig. 4.
Fig. 7 is a side view in the direction of arrow 7 of Fig. 5.

Referring to Figs. 1 to 3, a base 20 supports a fixed dovetail guide 21 received by a carriage base plate 22 which screws 23 connect with side plates 24 connected at their upper portion by cross bars 25. Plates 24 (Figs. 4 and 6) provide dovetail grooves 27 which guide vertically movable plates 28 which screws 29 connect with a bar 30 to which a shearing blade 31 is attached by screws 32 and a clamping block 33. Screws 34 attach to each plate 28 a cam plate 35 having a camming surface 35a, each camming surface engaging similar

2 surfaces provided by clamping jaws 36 and 37 and intermediate blocks 38 which screws 39 connect with the jaws. The blocks 38 are integral with plates 40 which are guided for horizontal movement by bars 41 attached by screws 42 to carriage base plate 22 which is provided with a slot 43 to provide clearance for the blade 31 in alignment with a slot 44 in the dovetail guide 21 which is in alignment with a slot 45 in the base 20, slots 44 and 45 being elongated so that the part of the tubing which is sheared by the blade 31 can pass through slots 44 and 45 from the slot 43 while the carriage assembly is moving. During downward movement of bar 30, the pairs of jaws 36 and 37 are caused to grip the tubing while the blade 31 moves between the jaws and cooperates therewith to shear the tubing.

The vertical movements of the bar 30 are effected by cam controlled movements of rollers 50 which screws 51, passing through plates 28, attach to bar 30, rotation of each of screws 51 being prevented by plug 52 which a screw 53 forces against the threads of a screw 51. Each roller 50 cooperates with an upper cam race 54 (Fig. 9) and lower cam race 55 formed in a block 60 which screws 61 attach to a bracket 62, attached to base 20. The end portion of each cam race receives a gate block 63 shaped as shown in Figs. 11 to 13 and supported for horizontal movement in a recess 64 provided by block 60 and urged into the position shown in Fig. 10 by a spring 65 surrounding a screw 66 connected with the block 63 and passing through a plate 67 which screws 68 attach to block 60. Spring 65 urges block 63 to the right (Fig. 10) until the head of the screw engages the plate 67. In Fig. 2 the upper race 54 is indicated by the dot-dash line 54a and the lower race by line 55a. A roller 50 is indicated by the dot-dash circle 50a and also in Fig. 9. In Figs. 2 and 9 roller 50a is shown in the position which it will have when the carriage has moved fully to the right after the tubing has been cut. Preparatory to the next operation, the carriage moves to the left and during this movement each roller 50a moves toward the left from its position shown in Fig. 9 through to the cam race 54. As it moves through the end portion of the race, the head of screw 51 which supports the roller 50 engages the block 63 and pushes it inwardly so that the roller can pass from the end of the race 54 to the beginning of race 55. When the roller 50 arrives at this position, the block 63 returns to normal position so as to block movement of the roller backward into race 54 and to guide it forwardly with respect to the race 55. As the carriage moves from left position toward the right position, shown in Fig. 2, the roller moves through the race 55 thereby causing the bar 30 to move down to effect clamping of the tubing and the cutting thereof and then to move upwardly into the beginning of race 54. As the roller moves upwardly the head of the screw 51 engages a second gate block 63 to force it inwardly and then permit its return when the roller 50 arrives at the position 50a, thus insuring that the roller will be guided through the track 54 during left movement of the carriage as viewed in Fig. 2.

The horizontal movements of the carriage are effected by an hydraulic servo comprising a cylinder 70 attached to brackets 20b integral with base 20 and containing a piston 71 (Fig. 14) connected with a rod 72 having a threaded end passing through a bar 73 attached by screws 74 to the carriage side plates 24 (Fig. 3). The rod 72 is secured to the bar 73 by nuts 75 and 76 threaded on the rod, said nuts being tightened against the bar 73 when the carriage is properly located relative to the rod 72.

Referring to Fig. 14, the ends of the cylinder 70 are connected by pipes 81 and 82 respectively to the distribution ports 83 and 84, respectively, of a valve 80 having an inlet port 85 connected by pipe 86 with an outlet of a pump 87 whose inlet is connected by pipe 88 with hydraulic fluid in a tank 89. The outlet ports 90 and 91 of valve 80 are connected by pipe 92 which returns to the tank the fluid exhausted from the cylinder 70. Valve 80 has a movable spool valve comprising lands 93 and 94 attached to a rod 95 connected with solenoid armatures 96 and 97 cooperating, respectively, with solenoid magnets 98 and 99. When solenoid 99 is energized, the valve lands occupy the positions shown in full lines in order to connect pipe 86 with pipe 81 so that the piston 71 will move to the left. When solenoid 98 is energized and solenoid 99 is not energized, the lands 93 and 94 are moved to the right as indicated at 93' and 94' so as to connect pipe 86 with pipe 82 so that the piston 71 will move toward the right to the position 71'.

The electrical circuit which controls the solenoid will now be described. A switch 100 connects a current source, preferably 110 volts, A. C., with wires 101 and 102 which are connected with the primary p1 of a transformer T1 having a secondary s1 connected with the cathode 103 of a rectifier tube 105 whose plates 104 are connected with the ends of a secondary s2 whose center tap is connected by wire 106 with a switch contact 107 which by a contact 108 is connected with a contact 109. Contact 108 is connected with solenoid armature 110 surrounded by solenoid coil 111 having one end connected with wire 101 and the other connected with contact 112 adapted to be engaged by a contact 113 carried by bimetal blade 114 connected with wire 102. A blade heater resistance 115 connects wires 102 and 101. When switch 100 is closed, heater resistance 115 receives current. After a predetermined time sufficient to heat the cathode 103 of tube 105 and the cathode 122 of tube 120 by means of a heater 121 connected as indicated at x, x with a secondary s3 of transformer T1, the bimetal blade 114 is heated sufficiently to cause the contact 113 to engage the contact 112, thereby energizing coil 111 and causing connection of contacts 107 and 109 by contact 108. This effects the closing of a circuit required for the charging of condensers 116, said circuit comprising wire 106 from the center tap of secondary s2, contacts 107, 108 and 109, wire 117, wire 118, condensers 116, resistance 119, cathode 103 and plates 104, connected to the ends of secondary s2. The discharge circuit of the condensers 116 is shown in heavy lines and comprises wire 130, a normally closed switch 131, solenoid coil 98, wire 132, plate 123 of tube 120, cathode 122 and wire 118. Tube 120 is biased for non-conduction by a battery 133 which is connected with control grids 124 and 125 and with the winding 126 of a transformer T2 having a winding 127 connected in series with a battery 128 and a normally closed switch 134. A condenser 129 connects grid 125 and cathode 122.

Normally the tube-gripping jaws of the carriage are open so that the tubing may pass between them in a path indicated by the dot-dash line 135 (Fig. 14). When the end of the tubing, moving toward the right, engages the blade 134a of switch 134 (which is located at a predetermined distance from the carriage) the circuit of the battery 128 is interrupted thereby causing a reduction in flux at the transformer T2 and inducing a current in winding 126 which opposes the battery 133 and thereby causes the tube 120 to become conducting, thereby effecting discharging of the condenser 116 through the circuit indicated by heavy lines. The solenoid 98 is rapidly energized and valve lands 93 and 94 move to positions 93' and 94' to cause the piston 71 and the carriage to move right. As the carriage moves right to permit the closing of a switch 140 controlling the circuit of the solenoid 99, the latter will not be energized because energization of solenoid 98 has opened switch 136 (in series with switch 140) by attracting armature 137 toward pole pieces 139 associated with this solenoid. Although the condensers 116 have discharged their electrical energy, solenoid 98 continues to be energized by current supplied by the condenser charging rectifier since the thyratron 120 continues to conduct until its plate circuit is interrupted. The carriage moves right to effect the gripping and shearing of the tubing and, when the carriage has arrived at its right-hand position, it will have engaged a plunger 131p to effect the opening of switch 131, thereby opening the plate circuit of thyratron 120 whereupon charging of the condensers 116 is resumed and the solenoid 98 is deenergized. Armature 137 is released and engages the contacts of switch 136, thereby effecting energization of coil 99 connected in series with wires 101 and 102 through switches 136 and 140. Therefore the valve lands 93 and 94 moves into the full-line positions, thereby connecting pipes 86 and 81; and piston 71 moves left and the carriage engages the plunger 140p of switch 140 to effect opening of the latter. During left movement of the carriage switch 134 closes and the tubing cut off is ejected by a suitable mechanism, not shown.

Satisfactory operation of this circuit is obtained by using condensers 116 each of 8 mfd., a resistance 119 of 5000 ohms, 75 watts for holding the peak charging circuit, a condenser 129 of 25 mmfd., a 12-volt battery 133, a 1.5 volt battery 128 and a transformer T2 of 3 to 1 ratio. The rectifier applies a charging current at 370 volts. Each solenoid is wound 7000 turns of No. 30 wire. By such an arrangement the timing interval between the opening of switch 134 and the response of solenoid 98 is extremely small and is substantially the same in duration. Consequently the interval of time between the opening of the switch 134 and the cutting of the tubing will be substantially uniform in duration so that the pieces of tubing will be practically uniform in length which is determined by the location of the switch blade 134a along the path of movement of the tubing.

If the machine is left idle with condensers 116 charged, they will discharge in about two minutes through a 1 meg-ohm resistance 116C. Condenser 127C, about .5 mfd. capacity, in parallel with transformer winding 127 shunts A. C. voltage.

While the embodiment of the present invention as herein disclosed, constitutes a preferred form, it is to be understood that other forms might be adopted.

What is claimed is as follows:

1. Apparatus for cutting longitudinally moving tubing into lengths comprising a carriage, means for guiding the carriage for movement parallel to the tubing, a tubing clamp and a tubing shear blade movably supported by the carriage, means for operating the clamp to grip the tubing and for operating the blade to sever the tubing, said means operable in response to movement of the carriage in the direction of movement of the tubing, a pressure fluid servo for moving the carriage, a valve for controlling the servo, solenoids for operating the valve to obtain respectively forward and reverse movements of the carriage, a relatively high voltage source for operating the solenoid which controls forward movement of the carriage, a first switch actuated by the forward end of the uncut tubing, means responsive to actuation of said first switch for effecting connection of the high voltage source with the coil of the last mentioned solenoid, a second switch opened in response to completion of forward movement of the carriage for effecting deenergization of said solenoid, and means operating in response to deenergization of said solenoid for effecting energization of the solenoid which controls reverse movement of the carriage.

2. Apparatus according to claim 1 in which the high voltage source includes a condenser and a source for charging it, in which the discharge circuit of the condenser includes the coil of the solenoid which controls forward movement of the carriage, the second switch which is normally closed and a thyratron normally biased for non-conduction, and in which means under control by the first switch effects biasing of the thyratron for conduction whereby the solenoid coil is energized by discharge of the condenser and by the condenser charging source until the second switch opens.

3. Apparatus according to claim 1 in which the solenoid coil which controls reverse movement of the carriage is connected with a current source through two switches in series, one being opened by the carriage at the end of reverse movement thereof and closed as the carriage moves forward, and the other switch being a normally closed switch which is opened by an electromagnet which includes the other solenoid coil.

4. In an apparatus for cutting longitudinally moving tubing into lengths and which includes a cutting mechanism supported on a movable carriage which is reciprocated adjacent the moving tubing during the cutting operation; means for effecting movement of said carriage comprising a pressure fluid servo for moving the carriage, a valve for controlling the servo, solenoids for operating the valve to obtain respectively forward and reverse movements of the carriage, a relatively high voltage source for operating the solenoid which controls forward movement of the carriage, a first switch actuated by the forward end of the uncut tubing, means responsive to actuation of said first switch for effecting connection of the high voltage source with the coil of the last mentioned solenoid, a second switch opened in response to completion of forward movement of the carriage for effecting deenergization of said solenoid, and means operating in response to deenergization of said solenoid for effecting energization of the solenoid which controls reverse movement of the carriage.

5. Apparatus according to claim 4 in which the high voltage source includes a condenser and a source for charging it, in which the discharge circuit of the condenser includes the coil of the solenoid which controls forward movement of the carriage, the second switch which is normally closed and a thyratron normally biased for non-conduction, and in which means under control by the first switch effects biasing of the thyratron for conduction whereby the solenoid coil is energized by discharge of the condenser and by the condenser charging source until the second switch opens.

6. Apparatus according to claim 4 in which the solenoid coil which controls reverse movement of the carriage is connected with a current source through two switches in series, one being opened by the carriage at the end of reverse movement thereof and closed as the carriage moves forward, and the other switch being a normally closed switch which is opened by an electromagnet which includes the other solenoid coil.

7. An apparatus according to claim 1 wherein said operating means comprises a stationary cam and a cam follower on said carriage engaging said stationary cam, said stationary cam having contours such that when said carriage is moved in the direction of movement of the tubing, said cam follower causes said tubing clamp to grip the tubing and said shear blade to sever the tubing, and then said cam follower causes retraction of the shear blade and release of the tubing by said tubing clamp.

8. Apparatus according to claim 7 wherein the stationary cam has races which respectively receive the cam follower during forward and reverse movements of the carriage, the terminus points of said races being provided with spring biased gate blocks which are retracted by forward movement of the cam follower through the race and thereafter block reverse movement of the cam follower through the race.

References Cited in the file of this patent

UNITED STATES PATENTS

| Number | Name | Date |
| --- | --- | --- |
| Re. 22,114 | Borzym | June 16, 1942 |
| 556,857 | Madden | Mar. 24, 1896 |
| 707,705 | Lockwood | Aug. 26, 1902 |
| 922,316 | McNally | May 18, 1909 |
| 1,498,550 | Johnston | June 24, 1924 |
| 1,648,829 | Sessions | Nov. 8, 1927 |
| 1,716,991 | Turner | June 11, 1929 |
| 1,724,635 | Bath | Aug. 13, 1929 |
| 1,800,005 | Braun | Apr. 7, 1931 |
| 2,021,066 | Huxford et al. | Nov. 12, 1935 |
| 2,053,026 | Foley | Sept. 1, 1936 |
| 2,161,150 | Flygate | June 6, 1939 |
| 2,179,105 | Sidney | Nov. 7, 1939 |
| 2,247,766 | Boerger | July 1, 1941 |
| 2,325,431 | Shippy | July 27, 1943 |
| 2,361,595 | Broersma | Oct. 31, 1944 |
| 2,458,290 | Monroe | Jan. 4, 1949 |